United States Patent
Cmielowski et al.

(10) Patent No.: US 9,524,475 B1
(45) Date of Patent: Dec. 20, 2016

(54) PRESENTING DISCRIMINANT CHANGE HISTORY RECORDS ON TOPOLOGY GRAPHS

(71) Applicant: International Business Machines Corporation, Armonk, NY (US)

(72) Inventors: Lukasz G. Cmielowski, Krakow (PL); Andrzej J. Wrobel, Krakow (PL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/986,974

(22) Filed: Jan. 4, 2016

(51) Int. Cl.
  *G06N 99/00* (2010.01)
  *G06F 17/30* (2006.01)
  *G06F 11/07* (2006.01)

(52) U.S. Cl.
  CPC ........... *G06N 99/005* (2013.01); *G06F 11/079* (2013.01); *G06F 11/0721* (2013.01); *G06F 17/30598* (2013.01)

(58) Field of Classification Search
  None
  See application file for complete search history.

(56) References Cited

U.S. PATENT DOCUMENTS

| | | | |
|---|---|---|---|
| 9,229,800 B2 * | 1/2016 | Jain | G06Q 30/01 |
| 2005/0097207 A1 * | 5/2005 | Gluhovsky | H04L 41/0681 709/224 |
| 2006/0229822 A1 * | 10/2006 | Theobald | G06Q 50/24 702/19 |
| 2008/0316213 A1 | 12/2008 | Eagen et al. | |
| 2014/0043983 A1 * | 2/2014 | Huang | H04L 43/08 370/244 |
| 2014/0351176 A1 * | 11/2014 | Jan | G06N 5/048 706/12 |
| 2015/0227838 A1 * | 8/2015 | Wang | G06F 11/008 706/12 |

* cited by examiner

*Primary Examiner* — Alan Chen
(74) *Attorney, Agent, or Firm* — Cantor Colburn LLP; Scott Dobson

(57) ABSTRACT

The described herein related to a method executable by a processor of a computing environment, where the processor is communicatively coupled to a database of the computing environment. The method includes identifying a feature set from a plurality of incident tickets available on the database and selecting a first subset of the feature set as a learning set. The method further includes generating information from the learning set, where the information indicates unique changes to the computing environment corresponding to a failure. The method further includes selecting a second subset of the feature set as a classification set, validating the information via the classification set to determine whether the learning set is rendering correct values; and sourcing the failure using the validated information based on determining that the learning set is rendering correct values.

16 Claims, 7 Drawing Sheets

Process Flow 400

Process Flow 100

US 9,524,475 B1

PRESENTING DISCRIMINANT CHANGE HISTORY RECORDS ON TOPOLOGY GRAPHS

BACKGROUND

The disclosure relates generally to presenting discriminant change history records on topology graphs, and more specifically to finding and presenting significant change history records to an operator to optimize ticket/outage fixes.

In general, contemporary implementations of environment change tracking software provides enormous amount of data. With the data, a change record represents each environment change (e.g., memory size change). Yet, due to the numerous environment changes each day, these contemporary implementations are limited in identifying when a particular change or change type is a root cause of a serious event or accident (e.g., bank online service is down).

SUMMARY

According to one embodiment, a method executable by a processor of a computing environment, where the processor is communicatively coupled to a database of the computing environment, is provided. The method includes identifying a feature set from a plurality of incident tickets available on the database and selecting a first subset of the feature set as a learning set. The method further includes generating information from the learning set, where the information indicates unique changes to the computing environment corresponding to a failure. The method further includes selecting a second subset of the feature set as a classification set, validating the information via the classification set to determine whether the learning set is rendering correct values; and sourcing the failure using the validated information based on determining that the learning set is rendering correct values. According to other embodiments, the method can be implemented in a computer program product or a system.

Additional features and advantages are realized through the techniques of the embodiments herein. Other embodiments and aspects of the embodiments are described in detail herein and are considered a part of embodiments herein. For a better understanding of the embodiments with the advantages and the features, refer to the description and to the drawings.

BRIEF DESCRIPTION OF THE SEVERAL VIEWS OF THE DRAWINGS

The subject matter herein is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

Figure 1:
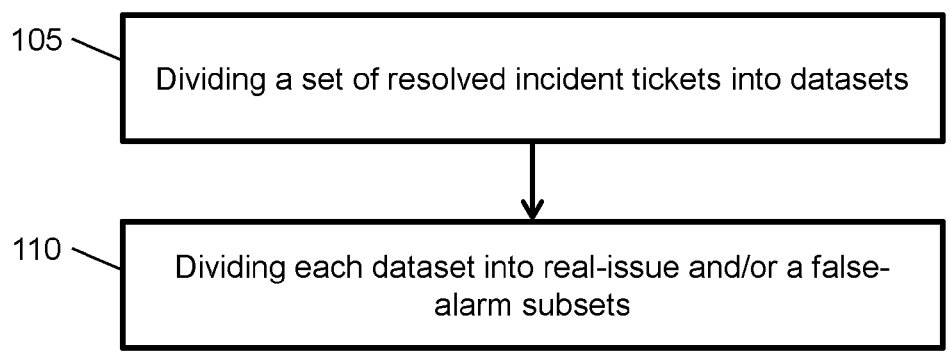
FIG. 1 illustrates a process flow for identifying discriminant change history records with a resolved status in accordance with an embodiment.

In view of the above, embodiments disclosed herein may include a system, method, and/or computer program product (herein the system) that presents discriminant change history records on topology graphs.

In operation, the system can record and/or receive recordings of changes (e.g., system crash, memory size change, offline service, etc.) to a computing environment. The computing environment can comprise one or more software and/or hardware components, including a database for storing a change history. That is, each change to the computing environment can be memorialized in a change history record that can represent that environment change and associated resolutions. The change history, in turn, comprises a collection of these change history records. By manipulating and managing the change history, the system can present discriminant change history records on topology graphs.

For instance, that system can include a significant feature extraction algorithm. The significant feature extraction algorithm of the system can identify an issue (e.g., an environmental change) within the system. Additionally, a user and/or an external system can also identify an issue within the system.

According to the issue, the significant feature extraction algorithm can classify the change history of the database, such as by dividing the change history records into a feature set (e.g., that aligns with the environmental change). The significant feature extraction algorithm can further divide the feature set into real alarm (or issue) and false alarm subsets. The system can utilize the feature set to perform machine learning. That is, the system, by utilizing the divided feature set, can generate information and/or metrics indicating attributes across the feature set. These attributes indicate the circumstances surrounding the environmental change. Further, the system can inversely use the machine learning of the significant feature extraction algorithm (e.g., the feature set) to perform selections of significant changes. The significant changes are used to validate the feature set so that a quality and accuracy of the feature set is realized by the system, thereby quickly and efficiently identifying a root cause of the environmental change.

For example, each change history record can correspond to an incident ticket, where each incident ticket can be associated with a resolution status. The resolution status can indicate whether an incident ticket was resolved, how that incident ticket was resolved (such as by a debug operation, by rebooting, etc.), and/or whether the incident was a real alarm or a false alarm. When the system encounters a new failure (e.g., a system crash), the system can select 80% of the plurality of incident tickets available on the database as a learning set. The learning set is utilized by the system to generate information and/or metrics that indicate what are the unique changes to the computing environment corresponding to this new failure and what attributes apply to these changes. Further, the system can inversely use the feature set to perform selections of significant changes. A significant change is a discriminant between a real alarm and a false alarm. That is, the system can select a classification set (the remaining 20% of the plurality of incident tickets) to validate the information and/or metrics generated from the learning set. This validation can indicate whether the learning set and associated attributes of the unique changes are rendering correct values. In turn, the new failure detected by the system can be sourced through the learning set and validated though a classification set. The system can further generate a topology graph configured to present discriminant changes related to the new failure based on the learning and classification sets, thereby allowing end-users to easily locate important information respective to the system crash within the plurality of incident tickets.

Turning now to FIG. 1, a process flow 100 for identifying discriminant change history records with a resolved status is generally shown in accordance with an embodiment. The process flow 100 begins at block 105, where the system divides a set of resolved incident tickets. The set of resolved incident tickets can be associated with the change history; thereby each resolved incident ticket is a change history record with a resolution status of resolved. The set of resolved incident tickets can be divided into a learning dataset and/or a classification dataset. Each of these dataset can comprise one or more incident tickets. At block 110, the system divides each of the learning and/or the classification datasets into real alarm and false alarm subsets. Note that discriminant between false alarm and real crash illustrates significance. The system can base this further division a resolution status of corresponding incident tickets.

Figure 2:
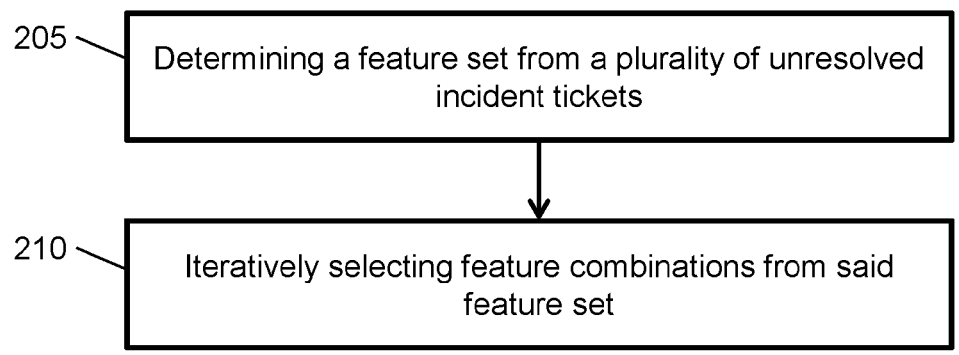
FIG. 2 illustrates a process flow for identifying discriminant change history records with an unresolved status in accordance with an embodiment

Turning now to FIG. 2, a process flow 200 for identifying discriminant change history records with an unresolved status is generally shown in accordance with an embodiment. The process flow 200 begins at block 205, where the system determines a feature set from a plurality of unresolved incident tickets. The determination for each of the unresolved incident tickets can be based on a set of attributes. The set of unresolved incident tickets can be associated with the change history; thereby each unresolved incident ticket is a change history record with a resolution status of unresolved. The set of attributes can enable the system to separate the set of unresolved incident tickets into categories. In one embodiment, the categories correspond to real alarm and false alarm subsets. At block 210, the system iteratively selects feature combinations from said feature set. The system can perform the iterative selection of each feature combination based on a process flow for presenting discriminant features.

Figure 3:
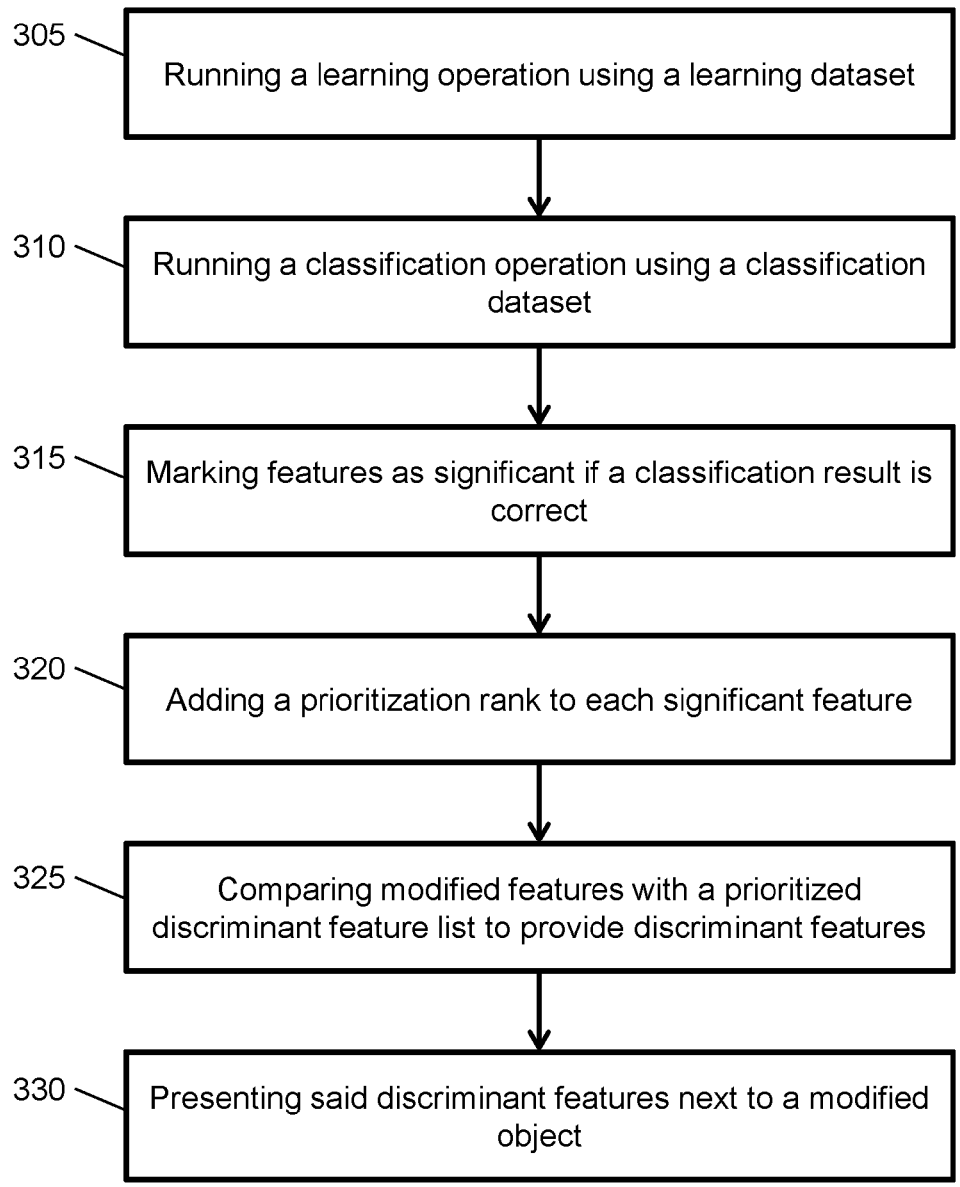
FIG. 3 illustrates a process flow for presenting discriminant features of the selected feature combinations in accordance with an embodiment.

As shown in FIG. 3, a process flow 300 for presenting discriminant features of the selected feature combinations is shown in accordance with an embodiment. The process flow 300 begins at block 305, where the system runs a learning operation using a learning dataset. At block 310, the system runs a classification operation using a classification dataset. At block 315, the system marks features as significant if a classification result is correct. At block 320, the system adds a prioritization rank to each significant feature. At block 325, the system compares modified features with a prioritized discriminant feature list to provide the discriminant features. At block 315, presents the system said discriminant features next to said modified object.

Figure 4:
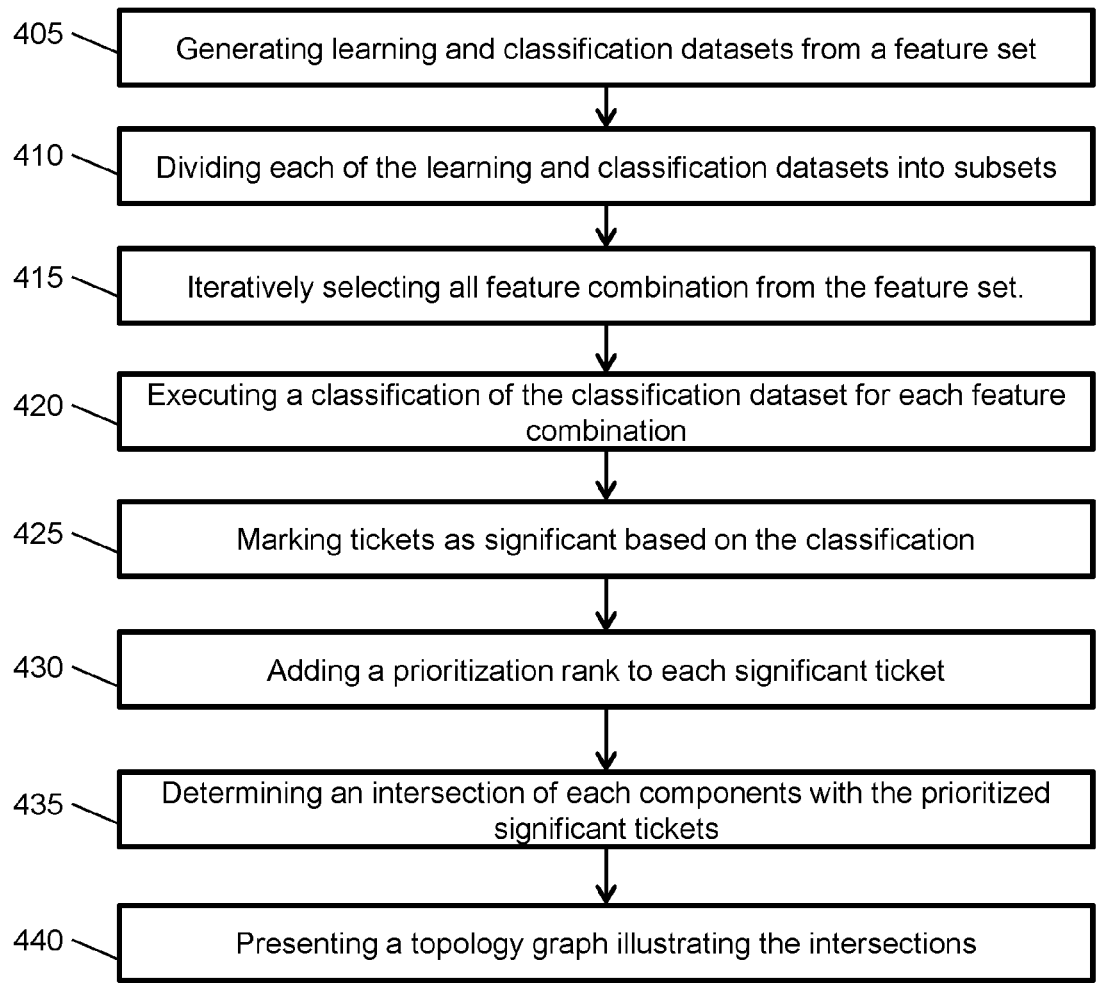
FIG. 4 illustrates another process flow for presenting discriminant features of the selected feature combinations in accordance with an embodiment.
Figure 5:
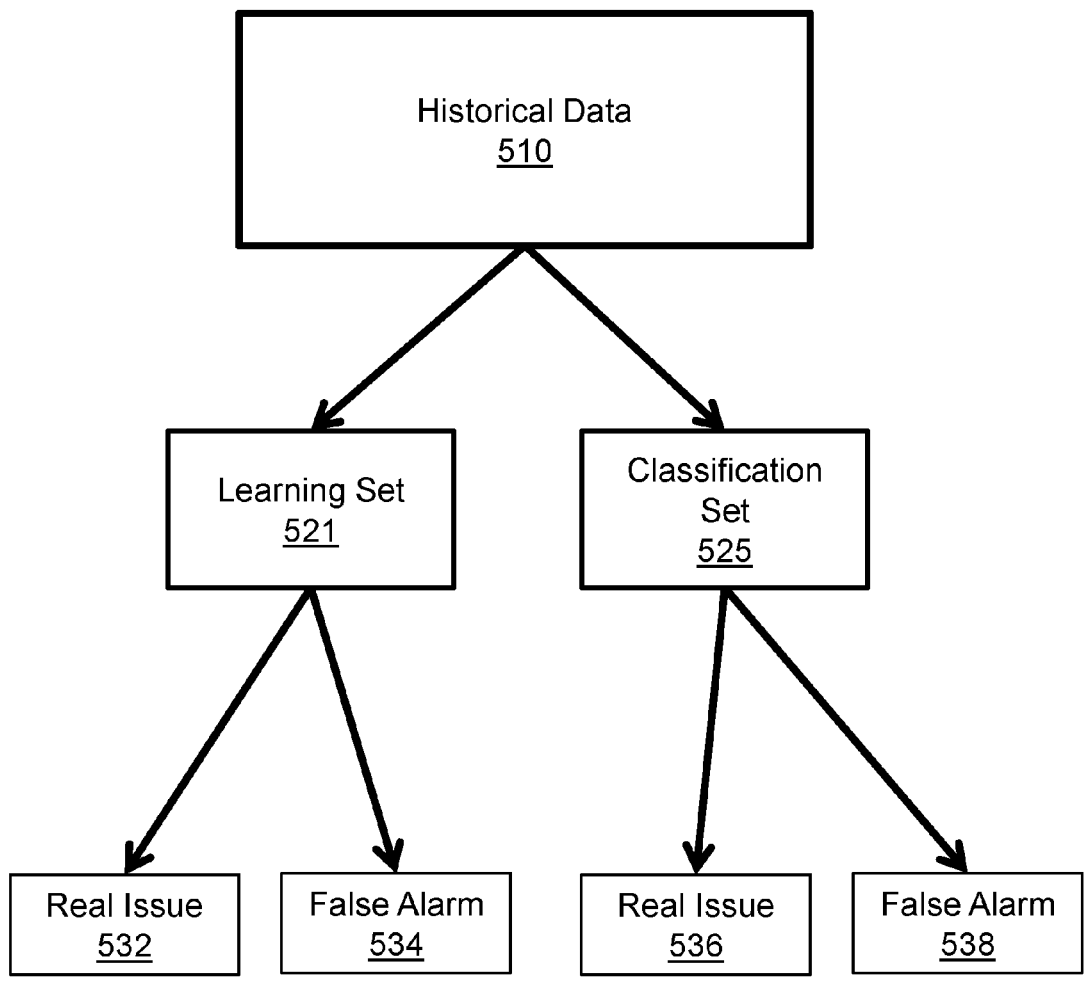
FIG. 5 illustrates an example chart graphing a division of historical data by a system in accordance with an embodiment.
Figure 6:
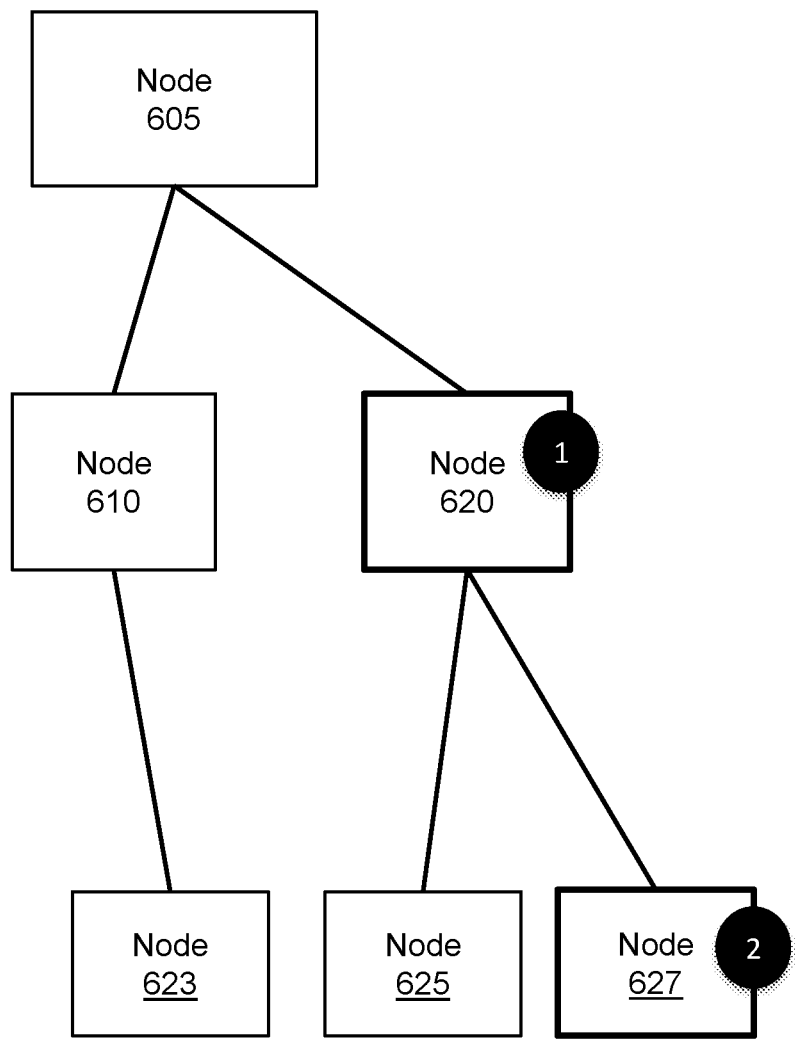
FIG. 6 illustrates an example topology of a computing environment in accordance with an embodiment.

Turning now to FIGS. 4-6 and, the system for presenting discriminant change history records on topology graphs will be described in detail in view of the above. Beginning with FIG. 4, a process flow 400 for discriminant change history records selection is generally shown in accordance with an embodiment.

Beginning at block 405, the system generates at least two data sets. In this embodiment, the two datasets are a learning dataset and a classification dataset generated from a feature set. The datasets can be generated based on resolved incident tickets of the database (with associated change history). The resolved incident tickets can be split, e.g., randomly. At block 410, each of the datasets of the feature set is further divided into subsets. For example, each of the learning and classification datasets can be further divided into two subsets based on a ticket resolution status, such as a real alarm and a false alarm.

FIG. 5 illustrates an example chart 500 graphing a division of historical data 510 of the database by the system in accordance with an embodiment. As shown in FIG. 5, the historical data 510 is divided into a learning set 521 and a classification set 525. The learning set 521 is further divided into a real issue 532 subset and a false alarm 534 subset. The classification set 525 is also divided into a real issue 536 subset and a false alarm 538 subset.

At block 415, the system iteratively selects all feature pairs, triples, quadruples, etc., from the feature set. That is, across the feature set, the system identifies a plurality of ticket combinations, where each ticket combination includes a similarity with respect to a resolution status. At block 420, the system executes a classification of the classification dataset for each such combination (e.g., using previously learned classifier on learning set). At block 425, the system marks each ticket as significant if a classification result corresponding to a combination including that ticket is correct. For example, when a classification of a first ticket in the classification dataset validates an identified ticket combination then the first ticket is marked as discriminant change record. Note that the system can validate the discriminant change record since tickets are closed and resolution status is known.

At block 430, the system adds prioritization rank to each significant ticket. For example, when a number of combinations lead to successful classification, than a corresponding ticket is given a higher number, which reflects a higher priority. The priority can be itemized by the system in a prioritized discriminant feature list.

At block 435, the system determines an intersection of components of the computing environment with prioritized discriminant feature list. For instance, each component can be considered an object modified by attributes (e.g., features). The priorities discriminant feature list can be used to determine how a component is modified. At block 440, the system presents the discriminant features next to modified object on topology graph, such as by a display as further described below. FIG. 6 illustrates an example topology graph 600 of the computing environment in accordance with an embodiment. As show in FIG. 6, the topology graph 600 shows nodes 605, 610, 620, 623, 625, 627. The node 605 can be considered the root node of the topology graph 600, which nodes 610 and 620 being child nodes. The nodes 610 and 620 can be considered parent nodes to the remaining nodes of the topology graph. The topology graph 600 further illustrates priority discriminant change history records (e.g., attribute) of '1' and '2' respectively associated with the nodes 620 and 627.

Thus, the topology graph 600 focuses on identifying the components (e.g., nodes) in the topology that have changed. Additionally, the topology graph 600 identifies the components that changed that have biggest impact on the issue found in topology 600. In this way, the parent node 620 has a higher priority of '1' than the child node 627 with a lower priority of '2', since a real issue (e.g., a system crash) at the parent node 620 will affect more of the topology graph 600 (all nodes of the sub-tree associated with parent node 620) than a real issue at only the child node 627.

Figure 7:
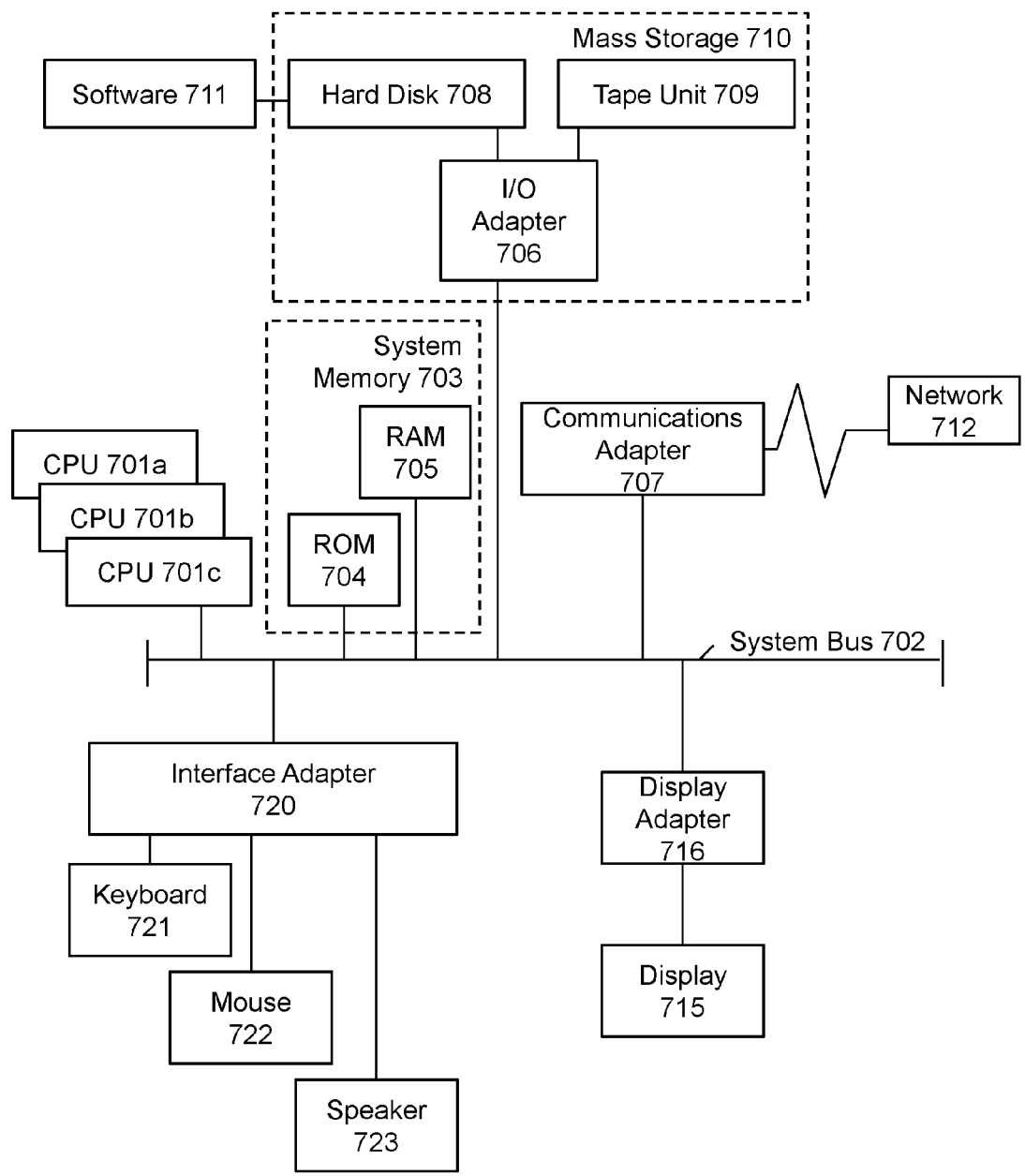
FIG. 7 illustrates a processing system in accordance with an embodiment.

Referring now to FIG. 7, there is shown an embodiment of a processing system 700 for implementing the teachings herein. In this embodiment, the processing system 700 has one or more central processing units (processors) 701a, 701b, 701c, etc. (collectively or generically referred to as processor(s) 701). The processors 701, also referred to as processing circuits, are coupled via a system bus 702 to system memory 703 and various other components. The system memory 703 can include read only memory (ROM) 704 and random access memory (RAM) 705. The ROM 704 is coupled to system bus 702 and may include a basic input/output system (BIOS), which controls certain basic functions of the processing system 700. RAM is read-write memory coupled to system bus 702 for use by processors 701.

FIG. 7 further depicts an input/output (I/O) adapter 706 and a network adapter 707 coupled to the system bus 702. I/O adapter 706 may be a small computer system interface (SCSI) adapter that communicates with a hard disk 708 and/or tape storage drive 709 or any other similar component. I/O adapter 706, hard disk 708, and tape storage drive 709 are collectively referred to herein as mass storage 710. Software 711 for execution on processing system 700 may be stored in mass storage 710. The mass storage 710 is an example of a tangible storage medium readable by the processors 701, where the software 711 is stored as instructions for execution by the processors 701 to perform a method, such as the process flows of the above FIGS. Network adapter 707 interconnects system bus 702 with an outside network 712 enabling processing system 700 to communicate with other such systems. A screen (e.g., a display monitor) 715 is connected to system bus 702 by display adapter 716, which may include a graphics controller to improve the performance of graphics intensive applications and a video controller. In one embodiment, adapters 706, 707, and 716 may be connected to one or more I/O buses that are connected to system bus 702 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 702 via an interface adapter 720 and the display adapter 716. A keyboard 721, mouse 722, and speaker 723 can be interconnected to system bus 702 via interface adapter 720, which may include, for example, a Super I/O chip integrating multiple device adapters into a single integrated circuit.

Thus, as configured in FIG. 7, processing system 705 includes processing capability in the form of processors 701, and, storage capability including system memory 703 and mass storage 710, input means such as keyboard 721 and mouse 722, and output capability including speaker 723 and display 715. In one embodiment, a portion of system memory 703 and mass storage 710 collectively store an operating system, such as the z/OS or AIX operating system from IBM Corporation, to coordinate the functions of the various components shown in FIG. 7.

Technical effects and benefits presenting significant and/or discriminant changes, thereby allowing end-users to easily locate important information within huge number of data.

Thus, embodiments described herein are necessarily rooted in a processing system to perform proactive operations to overcome problems specifically arising in the realm of environment change tracking software.

Embodiments herein may be a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments herein are described herein with reference to flowchart illustrations and/or block diagrams of methods, apparatus (systems), and computer program products according to embodiments herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method executable by a processor of a computing environment, the processor communicatively coupled to a database of the computing environment, comprising:

identifying, by the processor, a feature set from a plurality of incident tickets available on the database;

selecting, by the processor, a first subset of the feature set as a learning set;

generating, by the processor, information from the learning set, the information indicating unique changes to the computing environment corresponding to a failure;

selecting, by the processor, a second subset of the feature set as a classification set;

validating, by the processor, the information via the classification set to determine whether the learning set is rendering correct values;

sourcing, by the processor, the failure using the validated information based on determining that the learning set is rendering correct values; and presenting, by the processor, on a topology graph of the computing environment the failure, the validated information, and the feature set, wherein the topology graph is utilized to identify components of the computing environment that have priority based on changes associated with the failure, the validated information, and the feature set, wherein the priority is based on a prioritization rank added to incident tickets of the feature set.

2. The method of claim 1, further comprising dividing the learning set into real alarm and false alarm subsets.

3. The method of claim 1, wherein each of the plurality of incident tickets memorializes an environment change and includes a resolution status.

4. The method of claim 3, wherein the resolution status indicates whether the incident was a real alarm or a false alarm.

5. The method of claim 1, wherein the failure is a failed component within the computing environment.

6. The method of claim 1, wherein the priority is itemized by the processor in a prioritized discriminant feature list.

7. A computer program product, the computer program product comprising a computer readable storage medium having program instructions embodied therewith, the program instructions executable by a processor of a computing environment communicatively coupled to a database of the computing environment to cause the processor to perform:

identifying a feature set from a plurality of incident tickets available on the database;

selecting a first subset of the feature set as a learning set;

generating information from the learning set, the information indicating unique changes to the computing environment corresponding to a failure;

selecting a second subset of the feature set as a classification set;

validating the information via the classification set to determine whether the learning set is rendering correct values;

sourcing the failure using the validated information based on determining that the learning set is rendering correct values; and presenting on a topology graph of the computing environment the failure, the validated information, and the feature set, wherein the topology graph is utilized to identify components of the computing environment that have priority based on changes associated with the failure, the validated information, and the feature set, wherein the priority is based on a prioritization rank added to incident tickets of the feature set.

8. The computer program product of claim 7, wherein the program instructions are further executable by the processor to cause the processor to perform dividing the learning set into real alarm and false alarm subsets.

9. The computer program product of claim 7, wherein each of the plurality of incident tickets memorializes an environment change and includes a resolution status.

10. The method of claim 9, wherein the resolution status indicates whether the incident was a real alarm or a false alarm.

11. The computer program product of claim 7, wherein the failure is a failed component within the computing environment.

12. A computing system, comprising a database and a processor, the processor coupled to a memory storing program instructions thereon and communicatively coupled to the database, the program instructions executable by the processor to cause the system to perform:

identifying a feature set from a plurality of incident tickets available on the database;

selecting a first subset of the feature set as a learning set;

generating information from the learning set, the information indicating unique changes to the computing system corresponding to a failure;

selecting a second subset of the feature set as a classification set;

validating the information via the classification set to determine whether the learning set is rendering correct values;

sourcing the failure using the validated information based on determining that the learning set is rendering correct values; and presenting on a topology graph of the computing environment the failure, the validated information, and the feature set, wherein the topology graph is utilized to identify components of the computing environment that have priority based on changes associated with the failure, the validated information, and the feature set, wherein the priority is based on a prioritization rank added to incident tickets of the feature set.

13. The computing system of claim 12, wherein the program instructions are further executable by the processor to cause the processor to perform dividing the learning set into real alarm and false alarm subsets.

14. The computing system of claim 12, wherein each of the plurality of incident tickets memorializes a system change and includes a resolution status.

15. The computing system of claim 14, wherein the resolution status indicates whether the incident was a real alarm or a false alarm.

16. The computing system of claim 12, wherein the failure is a failed component within the computing system.

* * * * *